(12) United States Patent
Zhang et al.

(10) Patent No.: US 10,871,606 B2
(45) Date of Patent: Dec. 22, 2020

(54) LIGHT DIFFUSING COMPONENT, BACKLIGHT COMPONENT AND DISPLAY DEVICE

(71) Applicants: Hefei BOE Display Lighting Co., Ltd., Anhui (CN); BOE TECHNOLOGY GROUP CO., LTD., Beijing (CN)

(72) Inventors: Qiping Zhang, Beijing (CN); Yong Xu, Beijing (CN); Xing Wang, Beijing (CN)

(73) Assignees: Hefei BOE Display Lighting Co., Ltd., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/590,012

(22) Filed: Oct. 1, 2019

(65) Prior Publication Data
US 2020/0132911 A1    Apr. 30, 2020

(30) Foreign Application Priority Data
Oct. 29, 2018    (CN) .................... 2018 2 1760817 U (51) Int. Cl.
*F21V 8/00* (2006.01)

(52) U.S. Cl.
CPC ......... *G02B 6/0051* (2013.01); *G02B 6/0055* (2013.01)

(58) Field of Classification Search
CPC .... G02B 6/002; G02B 6/0061; G02B 6/0031; G02B 6/0058; G02B 6/0081
USPC ................................................. 362/621–622
See application file for complete search history.

(56) References Cited

U.S. PATENT DOCUMENTS 7,690,811 B2 * 4/2010 Durvasula ......... G02F 1/133611
362/246

* cited by examiner

*Primary Examiner* — William J Carter
(74) *Attorney, Agent, or Firm* — Thomas | Horstemeyer LLP (57) ABSTRACT

The present disclosure relates to a field of display technologies and provides a light diffusing component, a backlight component having the same, and a display device. The light diffusing component may include a main body, a protruding portion, and a reflecting portion. The protruding portion is disposed on a side of the main body and protruded from the main body; the reflecting portion is disposed on the protruding portion and an edge region of the main body portion connected to the protruding portion, so as to reflect light incident from a lower portion of the light diffusing component. Light transmittance of the reflecting portion gradually increases in a direction away from a center of the diffusing component.

20 Claims, 6 Drawing Sheets

FIG. 12

LIGHT DIFFUSING COMPONENT, BACKLIGHT COMPONENT AND DISPLAY DEVICE

CROSS-REFERENCE

This application is based upon and claims priority to Chinese Utility Model Application No. 201821760817.9, filed on Oct. 29, 2018, the entire contents thereof are incorporated herein by reference.

TECHNICAL FIELD

The present disclosure relates to the field of display technologies, and in particular, to a light diffusing component, a backlight component having the same, and a display device.

BACKGROUND

A liquid crystal display may include a panel and a backlight, and a light diffusing component may be disposed in the backlight.

In the prior art, in order to fix and position the light diffusing component during the assembling process, the light diffusing component is provided with a plurality of protruding portions. For example, 2-4 protrusions may be provided for positioning of the light diffusing component. The light diffusing component is assembled by using the protruding portions. Further, a light shielding tape or a light diffusing component fixing tape is used for positioning.

However, since the protruding portion is disposed, there is a problem of uneven brightness in the visible area.

Therefore, it is necessary to develop a new light diffusing component, a backlight component having the light diffusing component, and a display device.

The information disclosed in the Background section above is only for enhancing the understanding of the background of the present disclosure, and thus may include information that does not constitute prior art known to those of ordinary skill in the art.

SUMMARY

The present disclosure provides a light diffusing component, a backlight component having the same, and a display device.

According to an aspect of the present disclosure, a light diffusing component includes a main body. The light diffusing component includes a protruding portion, disposed on a side of the main body and protruded from the main body. The light diffusing component includes a reflecting portion, disposed on the protruding portion and an edge region of the main body connected to the protruding portion, so as to reflect light incident from a lower portion of the light diffusing component. Light transmittance of the reflecting portion gradually increases in a direction away from a center of the diffusing component.

In an example arrangement of the present disclosure, the reflecting portion includes a plurality of reflection points. A size and a density of at least one of the reflection points gradually decreases in the direction away from the center of the diffusing component. The density is a number of the reflection points within a predetermined area.

In an example arrangement of the present disclosure, the reflection points disposed on the edge region of the main body connected to the protruding portion are uniformly arranged in a row along the side of the main body.

In an example arrangement of the present disclosure, a color of the reflecting portion includes at least one of white and silver.

In an example arrangement of the present disclosure, the reflection points disposed on the protruding portion are uniformly arranged in a plurality of rows, and each of the plurality of rows extends in a direction parallel to the side of the body portion.

In an example arrangement of the present disclosure, the reflection points are points printed on the diffusing component.

In an example arrangement of the present disclosure, the reflecting portion is a reflective film, and light transmittance of the reflective film gradually increases in the direction away from the center of the diffusing component.

According to an aspect of the present disclosure, there is provided a backlight component including the light diffusing component of any of the above.

According to an aspect of the present disclosure, there is provided a display device including the backlight component of any of the above.

DETAILED DESCRIPTION

Example arrangements will now be described more fully with reference to the accompanying drawings. However, the arrangements can be implemented in a variety of forms and should not be construed as being limited to the examples set forth herein; rather, these arrangements are provided so that this disclosure will be more complete so as to convey the idea of the example arrangements to those skilled in this art. The same reference numerals in the drawings denote the same or similar parts, and the detailed description thereof will be omitted.

Figure 1:
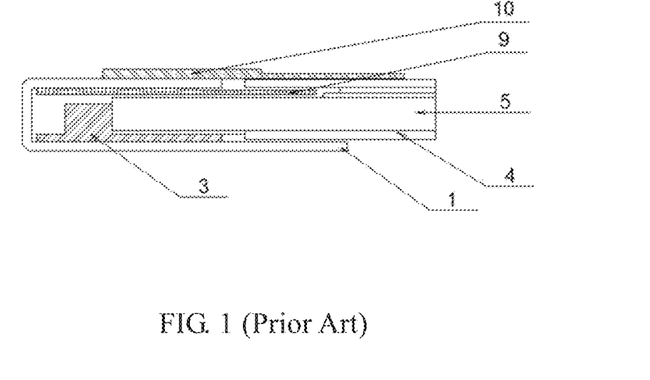
FIG. 1 is a schematic structural view of a backlight component in the related art.
Figure 2:
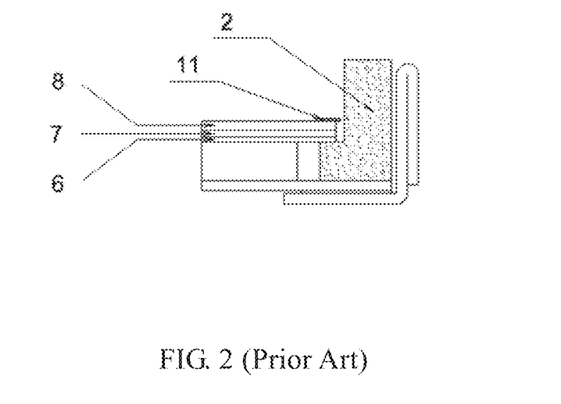
FIG. 2 is a schematic partial structural view of a backlight component in the related art.

In the related art, as shown in FIGS. 1 and 2, a liquid crystal display may include a liquid crystal panel and a backlight. According to the type of light source, the backlight can be divided into LED (Light Emitting Diode) backlight, CCFL (Cold Cathode Fluorescent Lamp) backlight, etc.; according to the type of size, the backlight may mainly be applied to a mobile phone, a tablet, a notebook, a monitor, a TV, etc. FIGS. 1 and 2 are partial cross-sectional structural diagrams of a backlight module with a size for the current Notebook, which may include a backboard 1, a plastic frame 2, an LED lamp group 3, a reflective sheet 4, a light guide plate 5, a diffusing sheet 6, a brightness enhancement sheet 7, and an upper diffusing sheet 8, a reflective tape 9, a light-shielding tape 10, a light diffusing component fixing tape 11, and the like. The backboard 1 and the plastic frame 2 constitute a structural skeleton of the backlight component. The reflective tape 9 may be used for improving the utilization of light and preventing the occurrence of poor shadowing. The light shielding tape 10 may be used for blocking the light leakage around the light diffusing component 13. The light diffusing component fixing tape 11 may be used for preventing displacement of the light diffusing component (for example, including the diffusing sheet 6, the brightness enhancement sheet 7, and the upper diffusing sheet 8).

Figure 3:
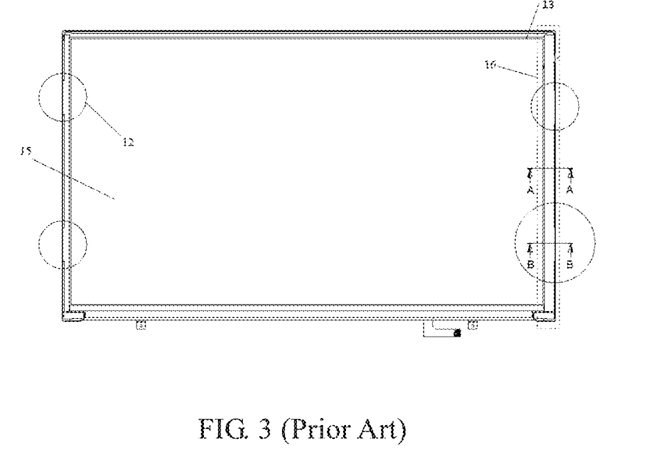
FIG. 3 is a schematic structural view of a light diffusing component provided with a protruding portion in the related art.
Figure 4:
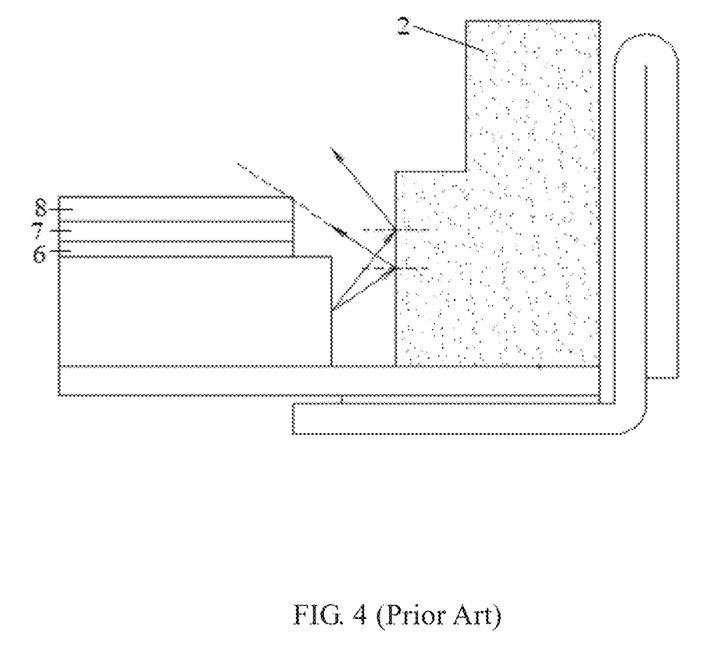
FIG. 4 is a cross-sectional view taken along line A-A of FIG. 3.
Figure 5:
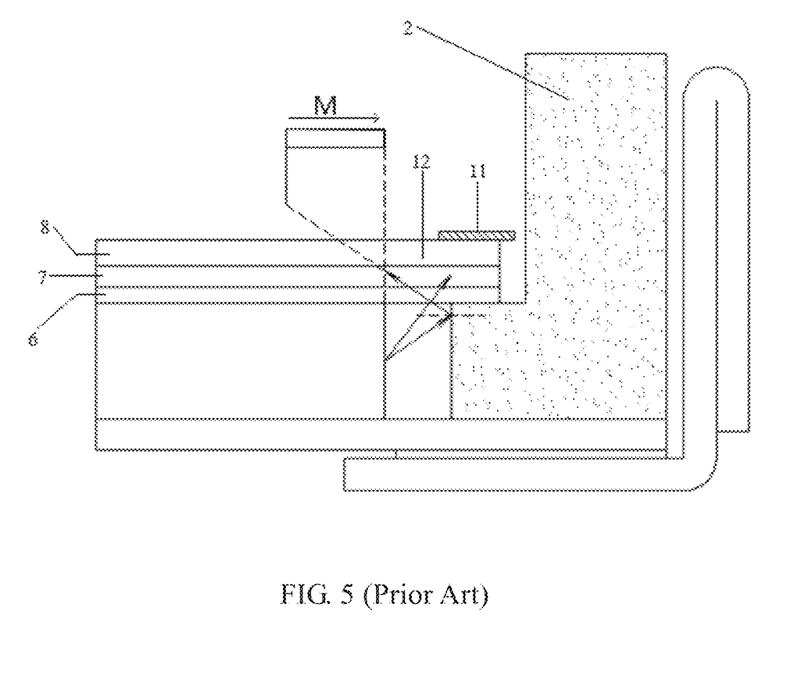
FIG. 5 is a cross-sectional view taken along line B-B of FIG. 3.

Referring to FIGS. 3, 4, and 5, the light diffusing component 13 is provided with a plurality of protruding portions (generally referred to as lugs) so as to fix and position the light diffusing component 13 during the assembling process. The protruding portion protrudes outward from the main body of the light diffusing component 13 to extend onto the plastic frame 2, thus being fixed to the plastic frame 2 by the fixing tape 11.

In a position of the light diffusing component 13 being provided with no protruding portion, most of the light emitted from the side of the light guide plate 5 can be reflected in a direction toward the visible area of the screen through the side of the plastic frame, and the screen has no obvious difference in brightness in the direction. However, in a position of the light diffusing component 13 being provided with the protruding portion, part of the light emitted from the side of the light guide plate 5 can still be reflected by the inner side of the plastic frame to the visible area of the screen, but a considerable part of the light is emitted from the side of the light guide plate 5, and then enters into the inside of the protruding portion of the light diffusing component 13. The energy of the considerable part of the light propagates inside the protruding portion of the light diffusing component 13, gradually decreases, and is consumed away at the position of the light diffusing component fixing member 11, and thus the considerable part of light cannot be reflected into the visible area of the screen. Thus, in the vicinity of the protruding portion of the light diffusing component 13, a tendency that the brightness decreases outwardly from the visible area of the screen is formed, and there is a phenomenon of uneven brightness in visual.

Figure 6:
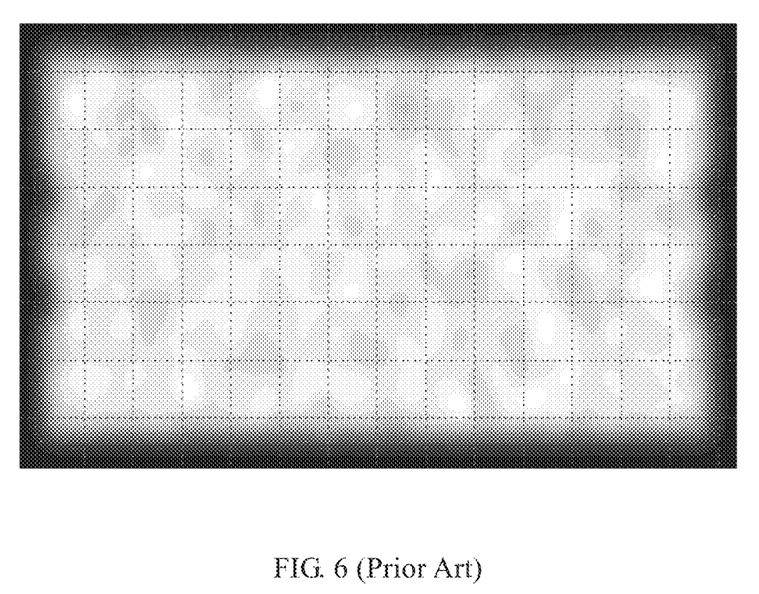
FIG. 6 is a schematic diagram of light emission of a light diffusing component in the related art.

Referring to FIGS. 5 and 6, along the same edge of the light diffusing component 13, there is such a difference between the edge provided with the protruding portion 12 and the edge provided with no protruding portion 12 that at the edge provided with no protruding portion 12, the light emitted from the side of the light guide plate 5 can be almost completely reflected by the inner surface of the frame back to the main body 15 of the light diffusing component 13; while at the edge provided with the protruding portion 12, a part of the light emitted from the end surface of the light guide plate 5 is reflected back to the main body 15 of the light diffusing component 13, and a part thereof is absorbed by the protruding portion 12. Therefore, the amount of light emitted from the main body 15 of the light diffusing component 13 is different at the portion provided with no protruding portion 12 and the portion provided with the protruding portion 12 along the edge of the light diffusing component 13, resulting in the phenomenon of uneven brightness, that is, the brightness gradually becomes darker in the direction indicated by the arrow M in the drawing.

Figure 7:
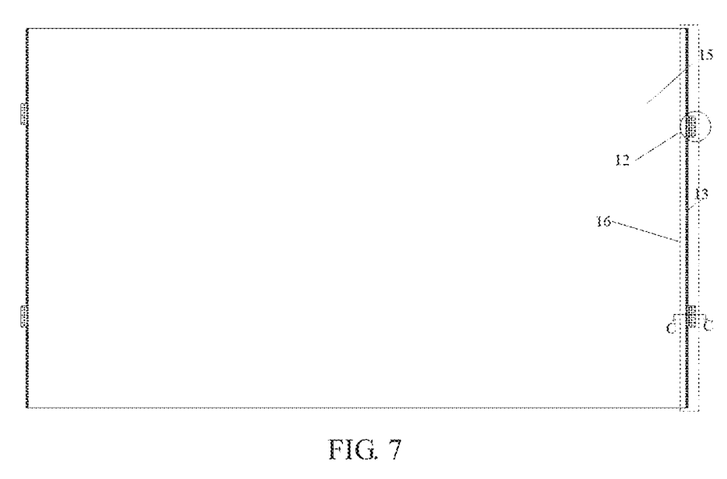
FIG. 7 is a schematic structural view of a light diffusing component provided with a reflecting portion in the present disclosure.
Figure 8:
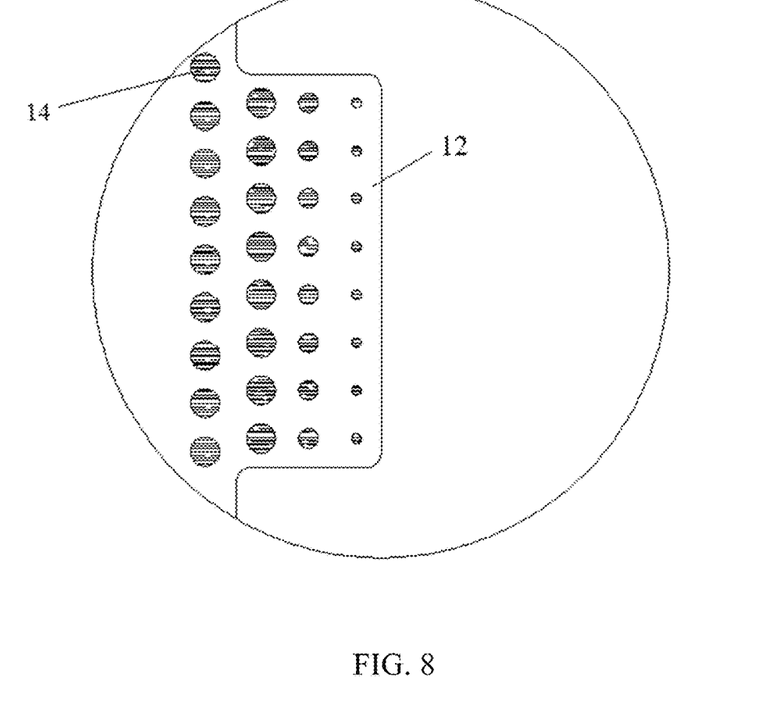
FIG. 8 is a partial enlarged view of a protruding portion of FIG. 7.

In the present example arrangement, referring to FIGS. 7 and 8, there is provided a light diffusing component 13. The light diffusing component 13 may be disposed on a light guide plate of the backlight component, and may include, for example, the above-described diffusing sheet 6, brightness enhancement sheet 7, and upper diffusing sheet 8, but the present disclosure is not limited thereto.

Structurally, the light diffusing component 13 may include a main body 15, a protruding portion 12, and a reflecting portion 14. The protruding portion 12 is disposed on a side of the main body 15 and protruded from the main body 15, that is, the protruding portion 12 extends from the main body 15; the reflecting portion 14 is disposed on the protruding portion and the edge region 16 of the main body 15 connected to the protruding portion 12, so as to reflect light incident from a lower portion of the light diffusing component 13. The light transmittance of the reflecting portion 14 gradually increases in a direction away from the center of the diffusing component 13.

In the present example arrangement, as shown in FIG. 7, the main body 15 is a main diffusing region of the light diffusing component. In the present arrangement, a portion where the light diffusing component emits light uniformly and the light is bright is used as the main body.

In the present example arrangement, referring to FIG. 7, the reflecting portion 14 is disposed on the protruding portion 12 and the edge region 16 of the main body 15 connected to the protruding portion 12, so as to reflect light incident from the lower portion of the light diffusing component 13. The light incident from the lower portion of the light diffusing component 13 is the light emitted from the light guide plate 5. The reflection portion 14 may include a plurality of reflection points, and the shape of the reflection points may be a circle, a rectangle, an ellipse, or a triangle or the like, which is not specifically limited in this arrangement.

In the present example arrangement, as shown in FIG. 8, the reflection points provided in the edge region 16 of the main body 15 connected to the protruding portion 12 are uniformly arranged in a row in a direction parallel to the edge of the main body 15. The reflection points disposed in the protruding portion 12 are uniformly arranged in a plurality of rows, and each of the rows is extended in the direction parallel to the edge of the main body 15. The reflection points are arranged in rows, and each row is provided with a plurality of the reflection points, and the number of reflection points of each row may be eight, nine or more, which is not specifically limited in this arrangement.

In the present example arrangement, as shown in FIG. 8, the reflection points of each row have the same size and shape. Along the direction away from the center of the light diffusing component 13, the sizes of the reflection points of the adjacent two rows may be different, the size of the reflection points gradually decrease, and the number does not change.

Figure 9:
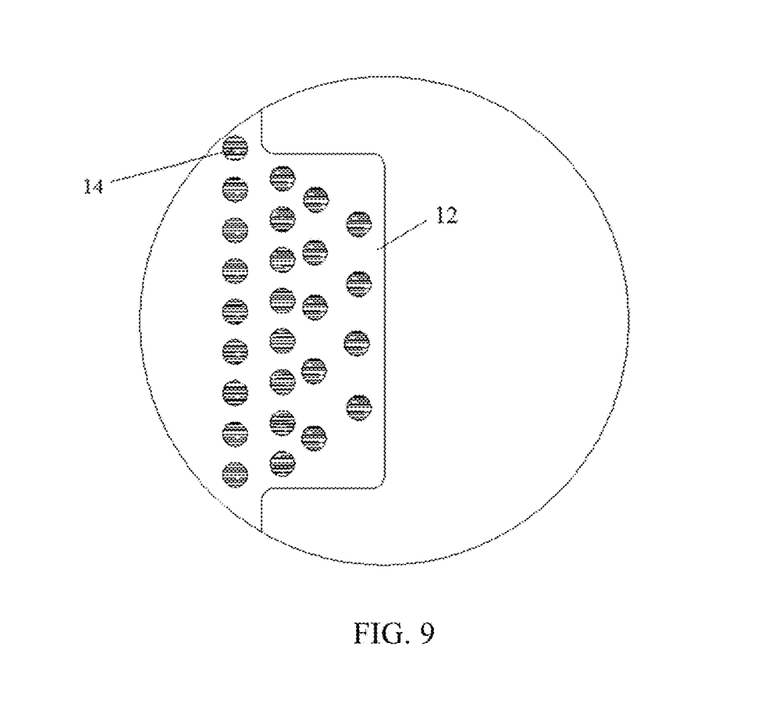
FIG. 9 is a schematic structural view of another arrangement of the present disclosure.

Alternatively as shown in FIG. 9, in the direction away from the center of the light diffusing component 13, the size of the reflecting point dose not changed, the number decreases, and the density thereof correspondingly becomes small.

Figure 10:
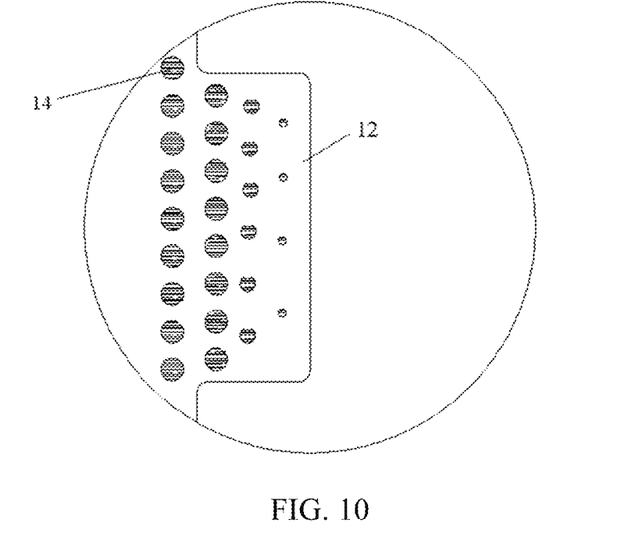
FIG. 10 is a schematic structural view of still another arrangement of the present disclosure.

Referring to FIG. 10, the reflection points may be arranged in such a manner that the size and density of the reflection points both decrease in the direction away from the center of the light diffusing component 13.

In the present example arrangement, the reflecting portion 14 may be points printed on the light diffusing component 13, and the printing manner may be screen-printing. The reflecting portion 14 may also be points attached to the light diffusing component. The color of the reflection point may be white, silver or white doped silver. In addition, the reflection point may be opaque and may have a good reflection effect. For example, the reflection point may also be a mirror structure attached to the light diffusing component 13, and thus have a good reflection effect.

Figure 11:
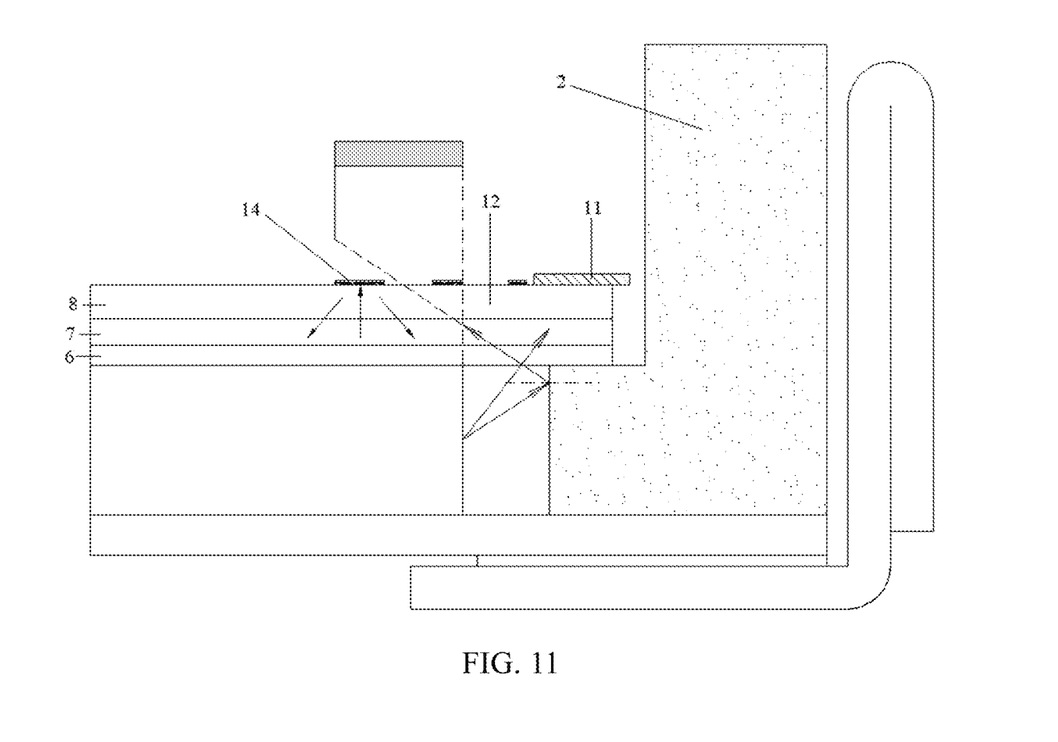
FIG. 11 is a cross-sectional view taken along line C-C of FIG. 7.
Figure 12:
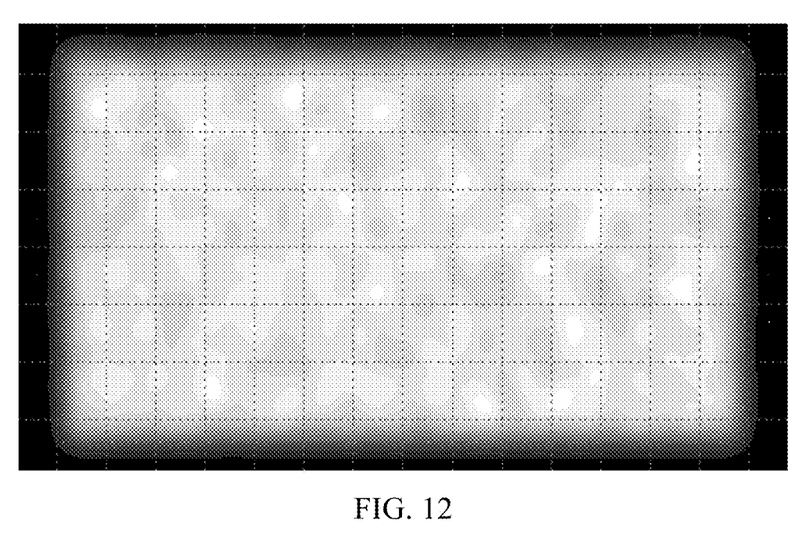
FIG. 12 is a schematic view of light emission of a light diffusing component of the present disclosure.

In the present example arrangement, as shown in FIGS. 11 and 12, the light emitted from the light guide plate 5 is reflected back into the light diffusing component 13 by the reflection points, and the reflection points near the center of the light diffusing component 13 are larger and the density thereof is higher, thus the light is blocked more; while the reflection points away from the center of the light diffusing component 13 are smaller and the density thereof is lower, and the light is blocked less, thus solving the problem that the brightness is uneven due to that the edge of the light diffusing component 13 is provided with the protruding portion 12.

Of course, the reflection points disposed on the edge region 16 of the main body 15 connected to the protruding portion 12 may also be arranged in a plurality of rows, the size and density gradually decrease along a direction close to the center of the light diffusing component 13. However, the row number and size of the reflective portions disposed on the main body 15 are positively correlated with the width of the frame covering the edge region 16 of the light diffusing component 13 of the display device, that is, the frame may cover the reflective portions disposed on the main body 15.

In another example arrangement, the reflecting portion 14 may also be a reflective film having a reflective function, but capable of transmitting light, and its light transmittance gradually increases in the direction away from the center of the light diffusing component 13. The reflective film can be attached to the light diffusing component, or a reflective film can be directly coated on the light diffusing component.

In the present example arrangement, the light transmittance can be better controlled by using the reflective film, so that the light emitted from the edge region of the light diffusing component is more uniform.

Further, the present disclosure further provides a backlight component including the light diffusing component 13 described above. The specific structure of the light diffusing component 13 has been described in detail above, and therefore, details are not described herein.

Still further, the present disclosure further provides a display device including the above backlight component. The backlight component includes the light diffusing component 13, and the specific structure of the light diffusing component 13 has been described in detail above, and therefore, details are not described herein.

The features, structures, or characteristics described above may be combined in any suitable manner in one or more arrangements, and the features discussed in the various arrangements are interchangeable, if possible. In the description above, numerous specific details are set forth to provide a thorough understanding of the arrangements of the present disclosure. However, those skilled in the art will appreciate that the technical solution of the present disclosure may be practiced without one or more of the specific details, or other methods, components, materials, and the like may be employed. In other instances, well-known structures, materials or operations are not shown or described in detail to avoid obscuring various aspects of the present disclosure.

The terms "about" or "approximately" as used in this specification generally mean within 20% of a given value or range, preferably within 10%, and more preferably within 5%. The number given herein are approximate number, that is, the meaning of "about", "generally", and "approximately" may be implied, unless otherwise specified.

Although the relative terms such as "above" and "below" are used in the specification to describe the relative relationship of one component to another component shown, these terms are only for convenience in this specification, for example, according to an example direction shown in the drawings. It will be understood that if the device shown is flipped upside down, the component described "above" will become the component "below". Other relative terms, such as "high", "low", "top", "bottom", "left", "right", etc., also have similar meanings. When a structure is "on" another structure, it may mean that a structure is integrally formed on another structure, or that a structure is "directly" disposed on another structure, or that a structure is "indirectly" disposed on another structure through other structures.

In the present specification, the terms "one", "a", "the", "said", and "at least one" is used to indicate that there are one or more elements/components or the like; the terms "include", "contain" and "have" are used to indicate an open type meaning of including and means that there may be additional elements/components/etc. in addition to the listed elements/components/etc.; the terms "first", "second" and "third" etc. are used only as markers, and do not limit the number of objects.

It should be understood that the present disclosure is not limited to the detailed structure and arrangement of the components proposed by the present specification. The present disclosure is capable of having other arrangements, and be carried out and implemented in various manners. The foregoing variations and modifications fall within the scope of the present disclosure. It should be understood that the present disclosure disclosed and defined by the present specification extends to all alternative combinations of two or more of the individual features apparent or recited herein and/or in the drawings. All of these various combinations constitute a number of alternative aspects of the present disclosure. The arrangements described in the present specification are illustrative of the best mode for carrying out the disclosure and will enable those skilled in the art to utilize the present disclosure.

What is claimed is:

1. A light diffusing component applied to a backlight component of a display device, comprising:
   a main body that comprises a first side, a second side, a third side and a four side, wherein the first side and the third side are opposite to each other, the second side and the fourth side are opposite to each other and connected to the first side and the third side;
   a protruding portion, disposed on the first side of the main body portion and protruded from the first side of the main body portion;
   a reflecting portion, disposed on the protruding portion and an edge region of the main body portion connected to the protruding portion, so as to reflect light incident from a lower portion of the light diffusing component,
wherein the edge region is extended from the second side to the fourth side along the first side;
wherein light transmittance of the reflecting portion gradually increases in a direction away from a center of the light diffusing component,
wherein the reflecting portion is covered by a frame of the display device.

2. The light diffusing component according to claim 1, wherein the reflecting portion comprises a plurality of reflection points, and at least one of a size and a density of the reflection points gradually decreases in the direction away from the center of the light diffusing component.

3. The light diffusing component according to claim 2, wherein the reflection points disposed on the edge region of the main body portion connected to the protruding portion are uniformly arranged in a row along the side of the main body portion.

4. The light diffusing component according to claim 2, wherein a color of the reflection points comprises at least one of white and silver.

5. The light diffusing component according to claim 2, wherein the reflection points disposed on the protruding portion are uniformly arranged in at least one row, and each of at least one row extends in a direction parallel to the side of the body portion.

6. The light diffusing component according to claim 2, wherein the reflection points are a dot structure printed on the light diffusing component.

7. The light diffusing component according to claim 1, wherein the reflecting portion is a reflective film.

8. The light diffusing component according to claim 7, the reflective film is attached to or coated on the light diffusing component.

9. The backlight component according to claim 8, wherein the reflecting portion is a reflective film.

10. The backlight component according to claim 9, wherein the reflective film is attached to or coated on the light diffusing component.

11. A backlight component of a display device comprising a light diffusing component, wherein the light diffusing component comprises:
a main body that comprises a first side, a second side, a third side and a four side, wherein the first side and the third side are opposite to each other, the second side and the fourth side are opposite to each other and connected to the first side and the third side;
a protruding portion, disposed on the first side of the main body portion and protruded from the first side of the main body portion;
a reflecting portion, disposed on the protruding portion and an edge region of the main body portion connected to the protruding portion, so as to reflect light incident from a lower portion of the light diffusing component, wherein the edge region is extended from the second side to the fourth side along the first side;
wherein light transmittance of the reflecting portion gradually increases in a direction away from a center of the light diffusing component,
wherein the reflecting portion is covered by a frame of the display device.

12. The backlight component according to claim 11, wherein the reflecting portion comprises a plurality of reflection points, and at least one of a size and a density of the reflection points gradually decreases in the direction away from the center of the light diffusing component.

13. The backlight component according to claim 12, wherein the reflection points disposed on the edge region of the main body portion connected to the protruding portion are uniformly arranged in a row along the side of the main body portion.

14. The backlight component according to claim 12, wherein a color of the reflecting points comprises one or both of white and silver.

15. The backlight component according to claim 12, wherein the reflection points disposed on the protruding portion are uniformly arranged in at least one row, and each of the at least one row extends in a direction parallel to the side of the body portion.

16. The backlight component according to claim 12, wherein the reflection points are a dot structure printed on the light diffusing component.

17. The backlight component according to claim 11, further comprising:
a light guide plate;
a light source, disposed at a side of the light guide plate, wherein the light diffusing component is disposed on a surface of the light guide plate.

18. A display device comprising a backlight component having a light diffusing component, wherein the light diffusing component comprises:
a main body that comprises a first side, a second side, a third side and a four side, wherein the first side and the third side are opposite to each other, the second side and the fourth side are opposite to each other and connected to the first side and the third side;
a protruding portion, disposed on the first side of the main body portion and protruded from the first side of the main body portion, wherein the edge region is extended from the second side to the fourth side along the first side;
a reflecting portion, disposed on the protruding portion and an edge region of the main body portion connected to the protruding portion, so as to reflect light incident from a lower portion of the light diffusing component;
wherein light transmittance of the reflecting portion gradually increases in a direction away from a center of the light diffusing component,
wherein the reflecting portion is covered by a frame of the display device.

19. The display device according to claim 18, wherein the reflecting portion comprises a plurality of reflection points, and at least one of a size and a density of the reflection points gradually decreases in the direction away from the center of the light diffusing component.

20. The display device according to claim 19, wherein the reflection points disposed on the protruding portion are uniformly arranged in at least one row, and each of at least one row extends in a direction parallel to the side of the body portion.

* * * * *